Oct. 7, 1969    M. SCHWAB    3,471,191

HANDLE-FORMING TONGS-TYPE DEVICE

Filed Dec. 29, 1966

Inventor:
MANFRED SCHWAB
By:
Barnes, Kisselle, Raisch & Choate
ATTYS.

United States Patent Office 3,471,191
Patented Oct. 7, 1969

3,471,191
HANDLE-FORMING TONGS-TYPE DEVICE
Manfred Schwab, Geisenheim, Rhine, Germany, assignor to Walter Koss, offene Handelsgesellschaft, Geisenheim, Rhine, Germany, a firm
Filed Dec. 29, 1966, Ser. No. 605,633
Claims priority, application Germany, Jan. 8, 1966, Sch 39,624; Aug. 19, 1966, K 60,053
Int. Cl. B66c 1/52
U.S. Cl. 294—88                                                        5 Claims

ABSTRACT OF THE DISCLOSURE

A handle-forming tongs-type device having a pressure-medium-operated working piston which closes scissor-like tongs by wedge action and a manually operated valve for the admission and discharge of the pressure medium. The working piston contains a cavity open towards the scissor-like tongs, into which cavity the rearwardly extending tongs legs project, and which cavity has the oblique surface which produces the wedge action.

---

Figure 1:
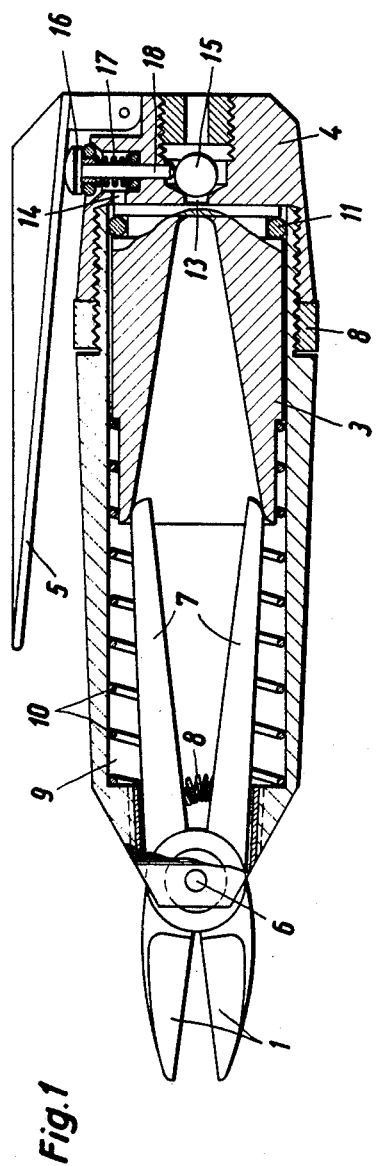

The invention relates to handle-forming tongs-type devices having a working piston operated by pressure medium which closes the tongs' jaws by wedge action and a manually actuated valve for the admission and release of the pressure medium. Such tongs-type devices may be equipped with tongs inserts of very different kinds, and thus be arranged for very different purposes; more especially the tongs-type devices may form pincers, cutting pliers or lead-sealing pliers; the tongs insert can also be formed as a combination tool, for example as combined lead-sealing and cutting pliers.

Tongs-type devices of the stated kind are already known in several forms of construction. According to one form of embodiment the working piston carries an eccentrically arranged wedge extending towards the tongs which wedge co-acts with one rearward tongs leg and, by forward movement of the piston, pivots this leg towards the second rearwardly extending tongs leg, which is fixed in the device. In the case of this device the asymmetric arrangement of the tongs insert and of the piston has proved disadvantageous both for production and for the actuation of the tongs insert. Moreover the wedge must have a relatively steep slope so that it is capable of changing the tongs insert from the open position into the closed position. On account of the asymmetry of the arrangement, this device does not ensure correct guidance of the working piston.

The latter drawback also exists in a second known tongs-type device, in which the piston carries a central extension piece formed as double wedge, which spreads the rearwardly pointing tongs legs apart on forward movement of the working piston. With this known embodiment of the tongs-type device there is the further essential disadvantage that the device must have a relatively great structural length.

In contrast thereto, the invention provides a new tongs-type device of the kind hereinbefore mentioned in which the said drawbacks are removed. The new device is characterised in that the working piston contains a cavity open towards the tongs, into which cavity the rearwardly extending tongs legs extend and which cavity has an oblique surface which produces the wedge action. Since the piston must have a relatively great length, careful guidance of the piston in the shaft of the device is ensured. Tilting of the piston is made impossible.

It has proved advantageous to provide in the cavity of the working piston two diametrically arranged oblique surfaces against which the rearward tongs legs bear. In this case a symmetrical force distribution is ensured and the inclination of the wedge surface may be relatively slight.

It has proved to be a further advantageous embodiment in which the cavity of the working piston is widened conically in the direction towards the tongs. Here again a symmetrical force distribution is ensured. Moreover, the piston can be turned as desired in relation to the tongs insert.

In a further development of the invention it is proposed that the handle-forming housing of the device consist of a forward sleeve, which contains the working piston and carries the tongs joint, and a rearward valve head on which the valve-actuating mechanism is mounted. With this construction of the housing the assembling of the appliance is greatly simplified; moreover trouble-free guidance of the working piston is ensured.

The particular advantage of the last-mentioned feature of the tongs-type device consists in that the valve head can be turned in relative to the housing sleeve and can secured in a plurality of positions. Thus it is rendered possible to turn the tongs insert in relation to the valve-actuating mechanism and thus to bring the tongs insert into the most favourable working position in each case. For the turning and securing of the valve head in relation to the housing sleeve it has proved especially advantageous for the valve head to be screwed onto the sleeve and to be capable of being made fast by means of a threaded ring fitted before it.

Figure 2:
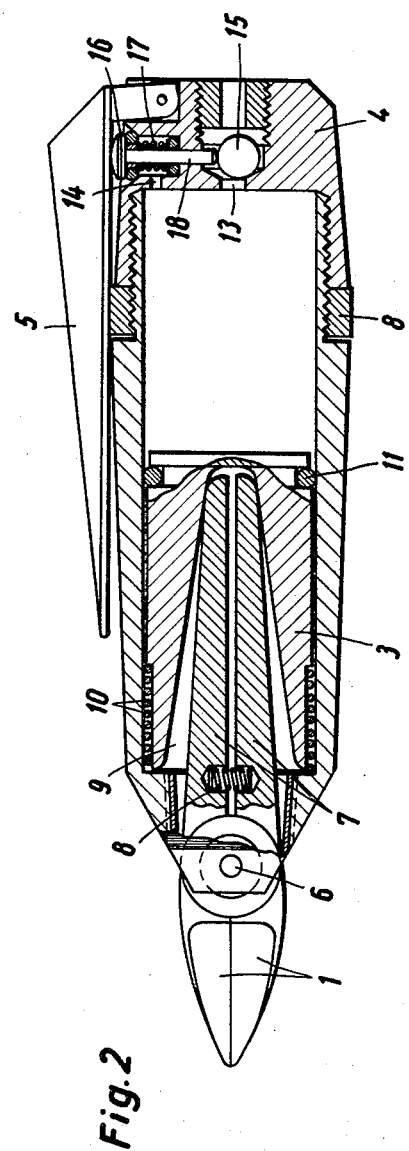

The invention will now be explained in greater detail with reference to the accompanying drawings, wherein:

FIGURE 1 shows a vertical longitudinal section through a handle-forming a tongs-type device in its initial position, FIGURE 2 shows the same device in the working position.

The device as illustrated consists of a tongs insert 1, a handle-forming housing sleeve 2 which contains a piston 3, and of a valve head 4 on which a valve-actuating lever 5 is articulated. The pivot pin 6 of the tongs insert 1 serves at the same time as connection element between tongs insert 1 and housing sleeve 2. The rearwardly pointing legs 7 of the tongs insert are subject to the influence of the expanding spring 8.

The piston 3 contains a conically widened bore 9, against the surface of which the tongs legs 7 bear. The piston 3 co-acts with a return spring 10 and is sealed at its rear end in the sleeve 2 by means of an O-ring 11.

The valve head 4 is screwed on to the rear end of the sleeve 2 and can be fixed in any rotational position in relation to the sleeve 2 with the aid of a threaded ring 12 fitted before it.

The valve head 4 has a compressed-air inlet 13 and a compressed-air outlet 14. The compressed-air inlet 13 is controlled by a ball valve 15, while the compressed-air outlet 14 can be opened and closed by means of a disc valve 16. The disc valve 16 is under the influence of a strong valve spring 17 by which it is forced against the actuating lever 5. On the disc valve 16 there is mounted a stem 18 which, on closing of the disc valve 16, removes the ball valve 15 from its seating and opens the way for the compressed air into the sleeve 2.

The manner of working of the tongs-type device is as follows:

In the normal position according to FIGURE 1, the outlet valve 16 is opened, while the inlet valve 15 is pressed against its seating by the compressed air. If now the lever 5 is operated and the outlet valve 16 is closed, then the stem 18 of the outlet valve 16 displaces the ball valve 15, so that compressed air enters the sleeve 2 and shifts the piston 3 in the forward direction. By this action, the return spring 10 is tensioned and at the same time the tongs legs 7 are pivoted towards one another, that is to say the tongs 1 are closed.

On release of the operating lever 5 the outlet valve 16 returns immediately into its open position, so that now the inlet valve 15 can assume its closed position again. The compressed air situated in the sleeve 2 escapes through the outlet opening 14, so that now the return spring 10 is enabled to return the piston 3 from the position according to FIGURE 2 into the initial position according to FIGURE 1. Consequently now the spring 8 can also exert its expanding force upon the tongs legs 7 and open the tongs 1.

The tongs insert 1 is produced in the usual way from steel. The housing sleeve 2, the piston 3 and the valve head may be produced from any desired suitable material especially from synthetic plastics material.

What I claim as new and desire to secure by Letters Patent of the United States is:

1. A handle-forming tongs-type device having pressure-medium-operated working piston which closes scissor-like tongs by wedge action and a manually operated valve for the admission and discharge of the pressure medium, characterised in that the working piston contains a cavity open towards the scissor-like tongs, into which cavity the rearwardly extending tongs legs project, and which cavity has the two oppositely arranged oblique surfaces which produce the wedge action.

2. A tongs-type device as claimed in claim 1, characterised in that the cavity of the working piston is widened conically in the direction towards the tongs.

3. A tongs-type appliance as claimed in claim 1 characterised in that the handle-forming housing is composed of a forward sleeve containing the working piston and carrying the tongs joint, and of a rearward valve head on which the valve-actuating mechanism is mounted.

4. A tongs-type device as claimed in claim 3, characterised in that the valve head is rotatable in relation to the housing sleeve and is securable in several positions.

5. A tongs-type device as claimed in claim 4, characterised in that the valve head is screwed on to the housing sleeve and is securable by means of a threaded ring fitted before it.

References Cited

UNITED STATES PATENTS

| | | | |
|---|---|---|---|
| 3,177,583 | 4/1965 | Fischer et al. | 30—180 |
| 1,719,584 | 7/1929 | Bonner | 294—115 X |
| 3,075,800 | 1/1963 | Rowekamp | 294—88 |
| 3,111,870 | 11/1963 | Anderson | 81—301 X |
| 3,269,223 | 8/1966 | Pawloski | 81—301 X |

FOREIGN PATENTS

| | | |
|---|---|---|
| 722,160 | 1/1955 | Great Britain. |
| 1,293,632 | 4/1962 | France. |

ANDRES H. NIELSON, Primary Examiner

U.S. Cl. X.R.

30—180